(No Model.)
R. GASKIN, Jr.
MACHINE FOR TRUING THE TEETH OF SAWS.
No. 383,720. Patented May 29, 1888.
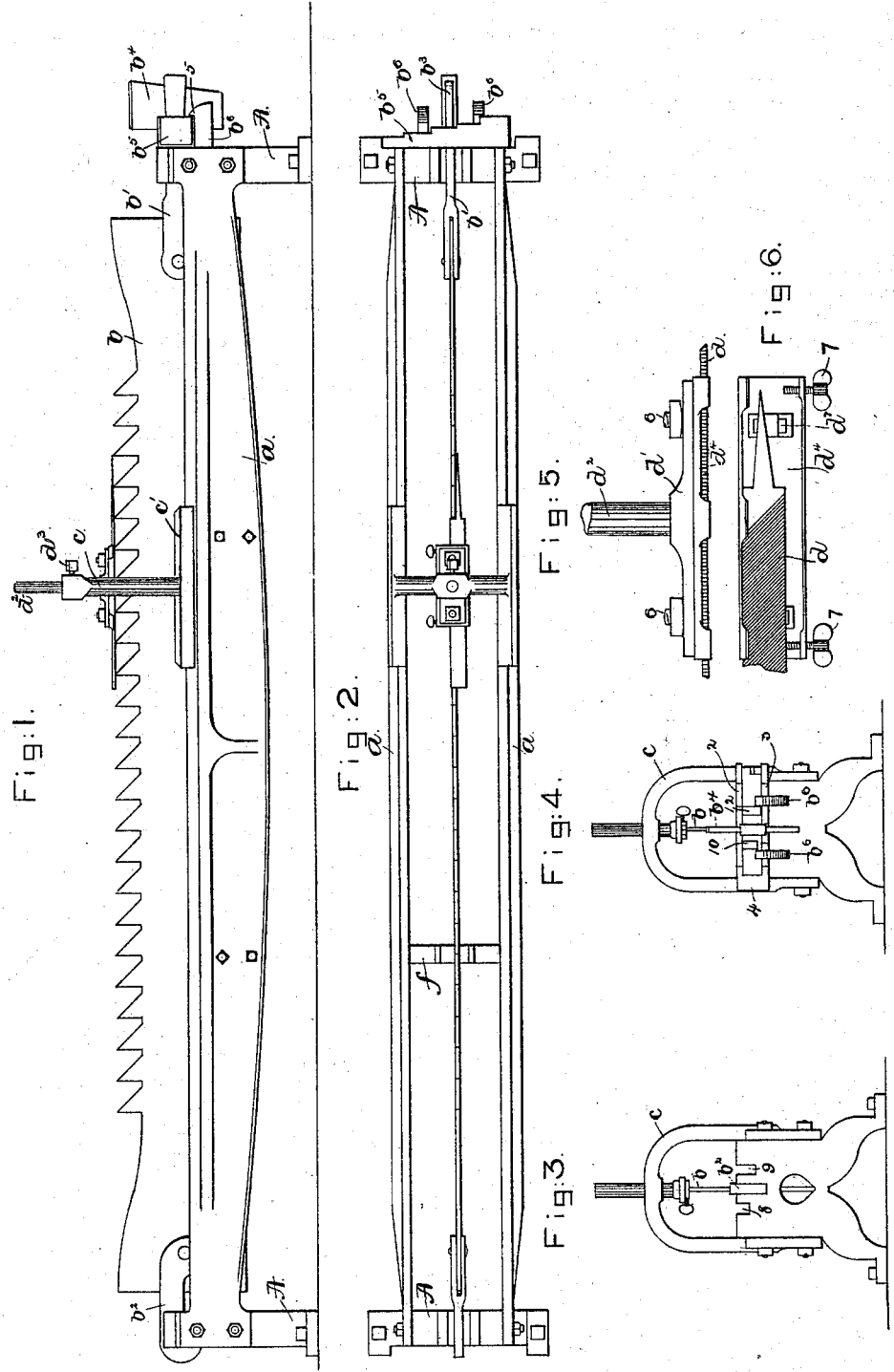
Witnesses:
Edgar A. Goddin
Frank L. Emery
Inventor:
Robert Gaskin Jr.
by Crosby & Gregory attys

United States Patent Office.

ROBERT GASKIN, JR., OF PORTLAND, NEW BRUNSWICK, CANADA.

MACHINE FOR TRUING THE TEETH OF SAWS.

SPECIFICATION forming part of Letters Patent No. 383,720, dated May 29, 1888.

Application filed January 21, 1888. Serial No. 261,480. (No model.)

*To all whom it may concern:*

Be it known that I, ROBERT GASKIN, Jr., of Portland, county of St. John, New Brunswick, Canada, have invented an Improvement in Machines for Truing the Teeth of Saws, of which the following description, in connection with the accompanying drawings, is a specification, like letters on the drawings representing like parts.

This invention has for its object to construct a machine for truing the teeth of saw-blades—such, for instance, as gang-saws—so that each tooth of the entire series of teeth may be presented to the material being sawed.

In accordance with this invention the saw-blade is held in a suitable frame under substantially the same tension or strain to which it is subjected when in operation, and a carriage slides upon the frame parallel with the saw, carrying just above the teeth thereof a file which is held in an adjustable block or carrier to be brought in contact with such teeth of the series as project farther than others, that such teeth may be filed off to a true imaginary line with the remaining teeth of the series.

Figure 1 shows in side elevation a machine for truing the teeth of saws embodying this invention; Fig. 2, a top view of the machine shown in Fig. 1; Fig. 3, a left-hand end elevation of the machine shown in Fig. 1; Fig. 4, a right-hand end elevation of the machine shown in Fig. 1; Fig. 5, an enlarged detail of the file-carrier, and Fig. 6 an under side view of the file-carrier shown in Fig. 5.

The main frame-work comprises the end frames, A, joined by long side bars, $a$, to present an open rectangular frame of any suitable length desired. A saw-blade, such as $b$, the teeth of which are to be trued, is provided at one end with the arm $b'$, having a loop like eye or slot, $b^3$, and at the other end with the arm $b^2$, having a hooked end.

The saw-blade $b$ is placed in the frame, the arms $b'$ $b^2$ entering notches cut in the end frames or standards, A. The saw is drawn taut or subjected to substantially the same strain or tension as when in operation by a key or block, $b^4$, passing down through the slot $b^3$ of the arm $b'$, and by a wedge-block, $b^5$, interposed between the end frame or standard, A, and the key $b^4$.

The inclined side of the wedge-block $b^5$ is herein shown as stepped, (see Fig. 2,) to present a firm bearing against which the key $b^4$ may bind to prevent slipping.

The wedge-block $b^5$ is preferably made as a bar having two arms, 2 3, joined at one end, as 4. The wedge-block $b^5$ rests upon supports $b^6$, rigidly attached to the frame A, and having upwardly-extended projections, as 5, at their outer ends. A yoke, $c$, is placed upon the rectangular frame, the lower ends of its arms being provided with bars $c'$, either attached to or formed integral with the yoke, said bars being shaped to slide upon the top of the side bars, $a$, and provided, or not, as desired, with rollers.

The yoke $c$ includes between its arms the toothed portion of the saw-blade, and a file, $d$, or other suitable implement, is held in a carrier, $d'$, attached to the lower end of a spindle, $d^2$, passing upward through the yoke $c$, and held adjustably by a set-screw, $d^3$, the said file-carrier moving with the said yoke to present the file to the saw-blade.

The file-carrier consists of a plate secured to the spindle $d^2$, and a trough-shaped clamp, $d^4$, secured to the under side of the said plate by bolts 6, said clamp being provided with set-screws 7 to hold the file in position. The bolts 6 pass through slots $d^7$ in the clamp $d^4$, to thereby permit the said clamp to be moved transversely to the plate to which it is attached. The file can thus be held at any height desired and also in any position transversely with relation to the frame, and will be moved parallel to the top of the side frames, $a$, which form guideways upon which the carriage slides.

The slots in each end frame, A, which receive the saw-blade, as shown in Fig. 1, are of substantially the same depth, so that the teeth of the saw lie parallel to the top of the side bars, $a$, and as the yoke $c$ is moved upon the frame above the teeth the file is adjusted to touch such teeth as project slightly beyond the others, so that such teeth may be filed off until the entire series presents a true imaginary line.

In practice some saws are wider at one end than at the other; hence I have provided additional slots in each of the frames A, of different depths, as 8 9 10 12, the slots 8 9 being of less depth than slots 10 12, so that when a saw-blade is made wider at one end than at the other the teeth may be made to occupy a position substantially parallel with the top of the side frames, $a$, so that the teeth may be trued in the manner above stated.

For long saw-blades a long frame is made, and I introduce one or more braces—such as $f$—between the side bars, $a$.

I do not desire to limit myself to the precise construction herein shown, nor to the employment of all the different details of construction, as the same may be modified in many respects and some eliminated and still retain the essential features of this invention.

I claim—

1. In a machine for truing saw-teeth, the rectangular open frame adapted to suspend the saw-blade, straining devices for subjecting the blade to a suitable tension, combined with a file-carrier adapted to move lengthwise upon the side bars of the frame to true the teeth of the saw, substantially as described.

2. In a machine for truing saw-teeth, the frame-work adapted to receive and suspend the saw, and means for holding the same under tension, combined with a universally-adjustable file-carrier moving upon the frame, substantially as described.

3. In a machine for truing saw-teeth, the frame adapted to hold the saw, combined with the yoke, and a vertically-adjustable file-carrier movable longitudinally upon the frame, substantially as described.

4. In a machine for truing saw-teeth, the frame to hold and suspend the saw, combined with a file-carrier made vertically and transversely adjustable, and the yoke to which the file-carrier is attached, movable upon the frame longitudinally, substantially as described.

5. In a machine for truing saw-teeth, the frame recessed at each end to receive the saw, combined with means, as the key $b^4$, and wedge-block interposed between the key $b^4$ and frame to subject the saw to longitudinal tension, substantially as described.

6. In a machine for truing saw-teeth, the frame recessed at each end to receive the saw, combined with means, as the key $b^4$, stepped wedge-block $b^5$, and the supports $b^6$, to regulate the tension of the suspended saw, substantially as described.

7. In a machine for truing saw-teeth, the frame provided at each end with notches or recesses of different depths to receive saws of different widths, substantially as and for the purposes described.

8. In a machine for truing saw-teeth, the frame, and straining devices adapted to hold and suspend the saw under a given tension, combined with a transversely-adjustable slotted file-carrier, substantially as described.

9. A file-carrier for truing saw-teeth, consisting of a clamp, $d^4$, adjustably attached to a plate fixed to a spindle, and fasteners, as set-screws 7, to hold the file in position transversely in the said clamp, substantially as described.

In testimony whereof I have signed my name to this specification in the presence of two subscribing witnesses.

ROBERT GASKIN, JUN.

Witnesses:
BERNICE J. NOYES,
FREDERICK L. EMERY.